United States Patent
Seo et al.

(10) Patent No.: US 10,614,312 B2
(45) Date of Patent: Apr. 7, 2020

(54) METHOD AND APPARATUS FOR DETERMINING SIGNATURE ACTOR AND IDENTIFYING VIDEO BASED ON PROBABILITY OF APPEARANCE OF SIGNATURE ACTOR

(71) Applicant: ELECTRONICS AND TELECOMMUNICATIONS RESEARCH INSTITUTE, Daejeon (KR)

(72) Inventors: Yong Seok Seo, Daejeon (KR); Dong Hyuck Im, Daejeon (KR); Won Young Yoo, Daejeon (KR); Jee Hyun Park, Daejeon (KR); Jung Hyun Kim, Daejeon (KR); Young Ho Suh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 450 days.

(21) Appl. No.: 15/428,247

(22) Filed: Feb. 9, 2017

(65) Prior Publication Data
US 2018/0189571 A1 Jul. 5, 2018

(30) Foreign Application Priority Data
Jan. 5, 2017 (KR) .................. 10-2017-0001933

(51) Int. Cl.
*G06K 9/00* (2006.01)
*G06K 9/62* (2006.01)

(52) U.S. Cl.
CPC ..... *G06K 9/00744* (2013.01); *G06K 9/00288* (2013.01); *G06K 9/6268* (2013.01)

(58) Field of Classification Search
CPC .................. G06K 9/6268; G06K 9/00288
See application file for complete search history.

(56) References Cited

U.S. PATENT DOCUMENTS

| | | | |
|---|---|---|---|
| 9,311,046 B1 * | 4/2016 | Hicks | ............... G06Q 30/02 |
| 2006/0110028 A1 | 5/2006 | Liu et al. | |
| 2007/0098267 A1 | 5/2007 | Lee et al. | |
| 2008/0118145 A1 | 5/2008 | Kim et al. | |
| 2009/0043725 A1 | 2/2009 | Gutta | |
| 2010/0036781 A1 | 2/2010 | Choi et al. | |
| 2012/0281886 A1 * | 11/2012 | He | ............... G06K 9/00288 382/118 |
| 2014/0226877 A1 | 8/2014 | Je et al. | |

FOREIGN PATENT DOCUMENTS

KR 10-2012-0036021 A 4/2012

* cited by examiner

*Primary Examiner* — William Spieler
(74) *Attorney, Agent, or Firm* — LRK Patent Law Firm

(57) ABSTRACT

A signature actor determination method for video identification includes setting a list of actors who appear in each of a plurality of videos, generating a plurality of subsets including the actors, and determining that an actor included in a single final set indicating a first video among the plurality of subsets is a signature actor of the first video. Accordingly, video identification is possible by using just a little information.

16 Claims, 8 Drawing Sheets

| MOVIE TITLE | SIGNATURE ACTOR |
|---|---|
| THE AGE OF SHADOWS | SONG KANG-HO, GONG YOO |
| THE MAP AGAINST THE WORLD | CHA SEUNG-WON, YOO JUN-SANG |
| THE TUNNEL | HA JUNG-WOO, OH DAL-SU |
| THE LAST PRINCESS | SON YE-JIN, PARK HAE-IL |
| TRAIN TO BUSAN | GONG YOO, JUNG YU-MI |
| OPERATION CHROMITE | LEE JUNG-JAE, LEE BEOM-SOO |
| WORST WOMAN | HAN YE-RI, KWON YUL |
| DETOUR | SHIN HA-KYUN, PARK HEE-SOON |
| TAKE OFF 2 | SOO AE, OH DAL-SU |
| SEONDAL: THE MAN WHO SELLS THE RIVER | YOO SEUNG-HO, CHO JAE-HYUN |
| THE HANDMAIDEN | KIM MIN-HEE, HA JUNG-WOO |
| FAMILYHOOD | KIM HYE-SOO, MA DONG-SEOK |
| TRICK | LEE JUNG-JIN, KANG YE-WON |
| THE WAILING | KWAK DO-WON, HWANG JUNG-MIN |
| THE HUNT | AHN SUNG-KI, CHO JIN-WOONG |

METHOD AND APPARATUS FOR DETERMINING SIGNATURE ACTOR AND IDENTIFYING VIDEO BASED ON PROBABILITY OF APPEARANCE OF SIGNATURE ACTOR

CROSS-REFERENCE TO RELATED APPLICATION(S)

This application claims priority to Korean Patent Application No. 10-2017-0001933, filed on Jan. 5, 2017 in the Korean Intellectual Property Office (KIPO), the entire contents of which are hereby incorporated by reference.

BACKGROUND

1. Field of the Invention

Example embodiments of the present invention relate in general to a method and apparatus for determining a signature actor and identifying a video, and more specifically, to a method and apparatus for determining a signature actor and identifying a video based on a probability of appearance of the signature actor.

2. Description of Related Art

A fingerprint (or content DNA)-based video identification method is a technology method for automatically identifying a video (e.g., a movie or a soap opera).

However, the fingerprint-based video identification method needs a process in which a fingerprint, which is a low-level signal feature of a video, is extracted in advance and stored in a database in order to identify a video.

Such a fingerprint-based video identification technique and a video filtering system using the technique need an original video to build a filtering database.

Also, the fingerprint-based video identification technique and a video filtering system using the technique have a technical limitation in that it is impossible to make an initial response to an illegal video that is distributed before a filtering database is built.

Recently, a face pre-learned through a graphics processing unit (GPU)-based high-speed calculation and deep-learning technology may be recognized from any video. When an actor matching a face detected from a video is recognized, the video may be identified as a specified video.

However, video identification based on facial recognition is usually performed by searching through all sections of a video. It is very inefficient to obtain an identification result by searching through all sections of a video.

SUMMARY

Accordingly, example embodiments of the present invention are provided to substantially obviate one or more problems due to limitations and disadvantages of the related art.

Example embodiments of the present invention provide a method and apparatus for determining a signature actor that may specify a video in order to quickly identify the video based on facial recognition.

Example embodiments of the present invention also provide a method and apparatus for identifying a video based on an appearance probability of a signature actor that may specify a video in order to quickly identify the video based on facial recognition.

In some example embodiments, a signature actor determination method performed by a processor includes setting an actor list including an actor appearing in each of a plurality of videos; generating a plurality of subsets including at least one actor in the actor list; determining a single final set indicating a first video from among the plurality of subsets; and determining an actor included in the final set as a signature actor of the first video.

The actor list may include a leading actor and a supporting actor who appear in each of the plurality of videos.

The actor list may include at least one actor having an appearance frequency greater than or equal to a predetermined reference.

The determining of a single final set may include setting a class-n including at least one subset composed of n actors among the plurality of subsets; and determining that a single first subset indicating the first video is the final set when the first subset is present in the class-n (n is an integer greater than or equal to 1).

The determining of a single final set may further include setting a class-(n+1) including at least one subset composed of n+1 actors among the plurality of subsets when there is no single first subset indicating the first video in the class-n; and determining that a single second subset indicating the first video is the final set when the second subset is present in the class-(n+1).

The appearance frequency may be determined based on at least one of a total number of appearances and an appearance time of each of the actors in the plurality of videos.

The signature actor determination method may further include analyzing an actor appearing in a second video to be discovered; and determining that the second video is the first video when the actor analyzed in the second video corresponds to the signature actor of the first video.

The determining of the second video as the first video may be performed based on information obtained through an appearance probability for each actor.

The determining of the second video as the first video may be performed using only information indicating a difference of appearance probabilities between two actors having the highest and second highest appearance probabilities greater than or equal to a predetermined value among the information obtained through the appearance probability for each of the actors.

In other example embodiments, a signature actor determination apparatus includes a processor; and a memory configured to store at least one instruction executable by the processor. The at least one instruction may be executed to set an actor list including an actor appearing in each of a plurality of videos, generate a plurality of subsets including at least one actor in the actor list, determine a single final set indicating a first video from among the plurality of subsets, and determine that an actor included in the final set is a signature actor of the first video.

The actor list may include a leading actor and a supporting actor who appear in each of the plurality of videos.

The actor list may include at least one actor having an appearance frequency greater than or equal to a predetermined reference.

When the final set is determined, the at least one instruction may be executed to set a class-n including at least one subset composed of n actors among the plurality of subsets and determine that a single first subset indicating the first video is the final set when the first subset is present in the class-n (n is an integer greater than or equal to 1).

When the final set is determined, the at least one instruction may be executed to set a class-(n+1) including at least one subset composed of n+1 actors among the plurality of subsets when there is no single first subset indicating the first image in the class-n and determine that a single second subset indicating the first video is the final set when the second subset is present in the class-(n+1).

The appearance frequency may be determined based on at least one of a total number of appearances and an appearance time of each of the actors in the plurality of videos.

The at least one instruction may be executed to analyze an actor appearing in a second video to be discovered and determine that the second video is the first video when the actor analyzed in the second video corresponds to the signature actor of the first video.

The determining of the second video as the first video may be performed based on information obtained through an appearance probability for each actor.

The determining of the second video as the first video may be performed using only information indicating a difference of appearance probabilities between two actors having the highest and second highest appearance probabilities greater than or equal to a predetermined value among the information obtained through the appearance probability for each of the actors.

BRIEF DESCRIPTION OF DRAWINGS

Example embodiments of the present invention will become more apparent by describing example embodiments of the present invention in detail with reference to the accompanying drawings, in which.

DESCRIPTION OF EXAMPLE EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It should be understood that, although the terms first, second, etc. may be used herein to describe various elements, these elements are not limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It should be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It should be further understood that the terms "comprises," "comprising," "includes," and/or "including" specify the presence of stated features, integers, steps, operations, elements, and/or components when used herein, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, example embodiments of the present invention will be described in detail with reference to the accompanying drawings. In describing the invention, in order to facilitate an overall understanding of the invention, like numbers refer to like elements throughout the description of the figures and a repetitive description thereof will be omitted.

Figure 1:
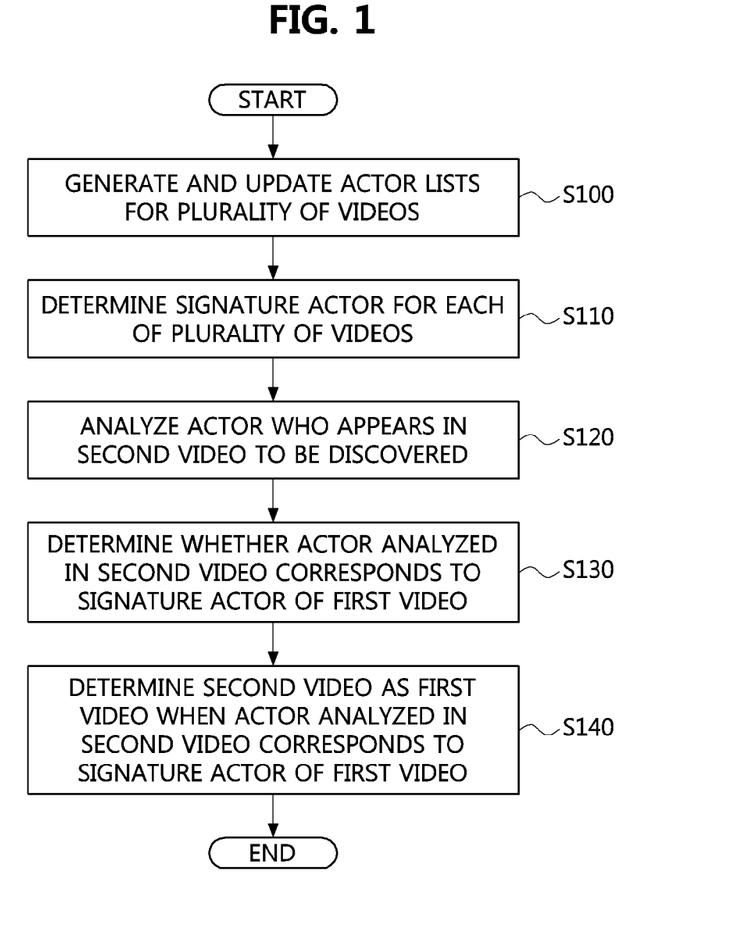
FIG. 1 is a flowchart showing a process of identifying a video using a signature actor.

FIG. 1 is a flowchart showing a process of identifying a video using a signature actor.

Referring to FIG. 1, a method in which a signature actor determination apparatus determines a signature actor may largely include generating and updating actor lists for a plurality of videos (S100), determining a signature actor for each of the plurality of videos (S110), analyzing an actor who appears in a second video to be discovered (S120), determining whether the actor analyzed in the second video corresponds to a signature actor of a first video (S130), and determining the second video as the first video when the actor analyzed in the second video corresponds to the signature actor of the first video (S140).

These operations may be performed by the signature actor determination apparatus (e.g., a processor), which may be configured as below.

Figure 2:
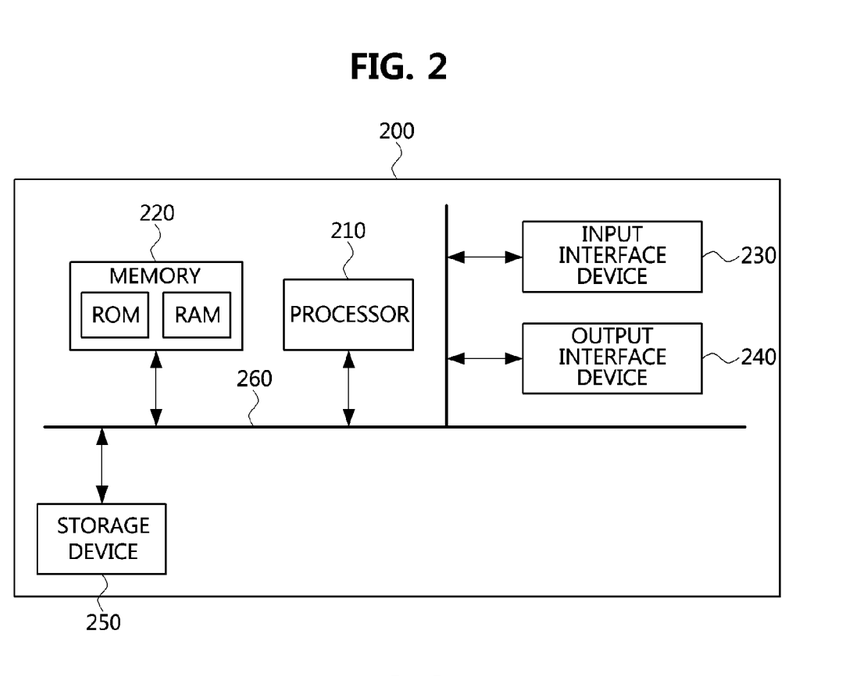
FIG. 2 is a block diagram showing an example of a signature actor determination apparatus.

FIG. 2 is a block diagram showing an example of a signature actor determination apparatus.

Referring to FIG. 2, a signature actor determination apparatus 200 may include at least one processor 210 and a memory 220, and may further include an input interface device 230, an output interface device 240, a storage device 250, etc. The components included in the signature actor determination apparatus 200 are connected via a bus 260 to communicate with one another.

The processor 210 may execute a program instruction stored in the memory 220 and/or the storage device 250. The processor 210 may refer to a central processing unit (CPU), a graphics processing unit (GPU), or a dedicated processor by which methods according to embodiments of the present invention are performed. The memory 220 and the storage device 250 may be composed of a volatile and/or non-volatile storage medium. For example, the memory 220 may be composed of a read only memory (ROM) and/or a random access memory (RAM).

Referring to FIG. 1 again, the signature actor determination apparatus may acquire a final actor list, which is a default database of signature actors, by generating and updating the actor lists for the plurality of videos. The generating and updating of actor lists may be performed as follows.

Figure 3:
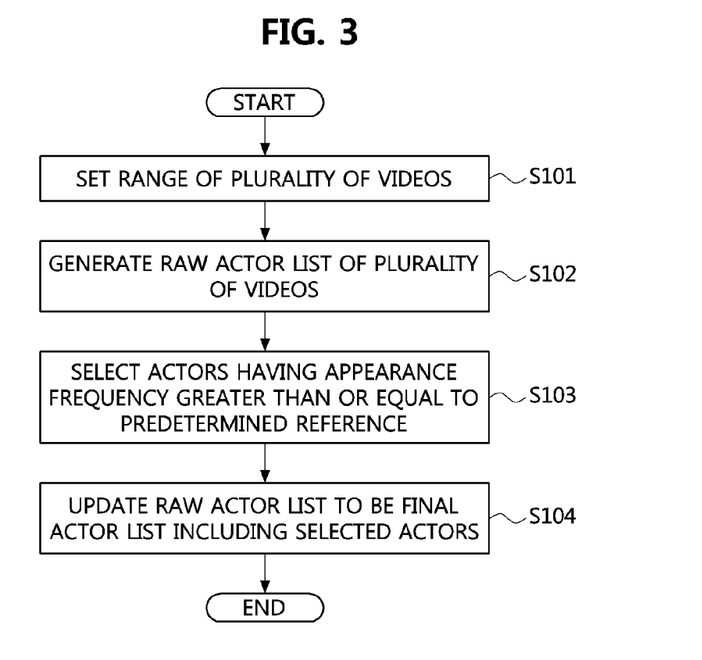
FIG. 3 is a flowchart showing a process of generating and updating an actor list.

FIG. 3 is a flowchart showing a process of generating and updating an actor list.

Referring to FIG. 3, first, the signature actor determination apparatus may set an identification range of a plurality of videos (S101).

The signature actor determination apparatus may classify the range of the plurality of videos on the basis of a video produced after a predetermine reference time. For example, the signature actor determination apparatus may set the range of the plurality of videos on the basis of "Korean movies and TV dramas that have been produced since 2010." Also, the signature actor determination apparatus may classify the range of the plurality of videos on the basis of a production country, a director, an actor, and a genre of the videos.

When the range of the plurality of videos is set, the signature actor determination apparatus may generate a raw actor list including all actors of the plurality of videos in the set range of the plurality of videos (S102).

The signature actor determination apparatus may generate the raw actor list on the basis of a leading actor and a supporting actor while excluding an extra among actors who appear in the plurality of videos. For example, in the case of the Korean movie "The Map Against the World," Cha Seung-won (leading actor), Yoo Jun-sang (leading actor), Kim In-kwon (supporting actor), Nam Ji-hyun (supporting actor), Shin Dong-mi (supporting actor), Nam Kyeong-eup (supporting actor), Kong Hyeong-jin (supporting actor), Tae In-ho (supporting actor), Kim Jong-soo (supporting actor), and Sung Ji-ru (supporting actor) may be included in the raw actor list.

After the raw actor list is generated, the signature actor determination apparatus may select actors having an appearance frequency greater than or equal to a predetermined reference from among a plurality of actors included in the raw actor list (S103).

The signature actor determination apparatus may determine the reference value of the appearance frequency on the basis of at least one of a total number of appearances and an appearance time of each actor in the plurality of videos.

For example, the signature actor determination apparatus may select actors having a number of appearances greater than or equal to a predetermined reference based on a reference of "an actor appearing 5 or more times" or a reference of "an actor appearing 7 or more times."

When the actors having a number of appearances greater than or equal to the predetermined reference are selected, the signature actor determination apparatus may update the raw actor list to be a final actor list including the actors having a number of appearances greater than or equal to the predetermined reference (S104).

As another embodiment, after the raw actor list is generated, actors having an appearance time greater than or equal to a predetermined reference may be selected from among the plurality of actors included in the raw actor list.

For example, the signature actor determination apparatus may select actors having an appearance time greater than or equal to a predetermined reference based on a reference of "an actor having an appearance time greater than or equal to 3 minutes" or a reference of "an actor having an appearance time greater than or equal to 5 minutes."

When the actors having the appearance time greater than or equal to the predetermined reference are selected, the signature actor determination apparatus may update the raw actor list to be a final actor list including the actors having the appearance time greater than or equal to the predetermined reference (S104).

The final actor list may be a database for determining a signature actor. Actors for each video title of the final actor list may be expressed as follows:

$$M_i = \{A_1, A_2, A_3, \ldots, A_k\}, 1 \leq i \leq N, 1 \leq k \leq n \quad \text{[Equation 1]}$$

where $M_i$ is a title of an $i^{th}$ video, $A_1, \ldots, A_k$ are actors of the video, K is the number of actors of the final actor list of the video, and N is the number of videos to be identified. A diagram including a final actor list for each video may be expressed as follows.

Figure 4:
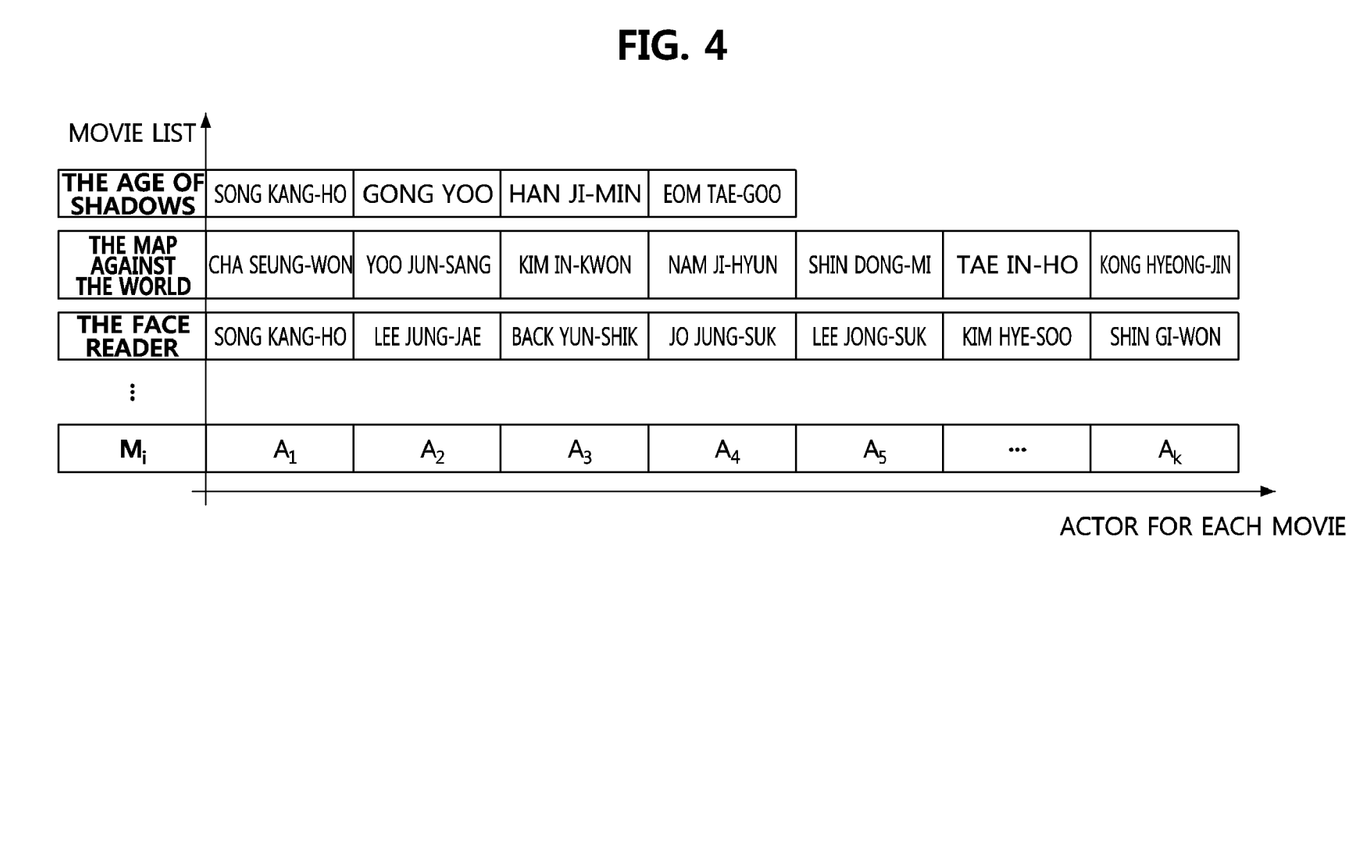
FIG. 4 is a conceptual view showing a configuration of a final actor list for each video.

FIG. 4 is a conceptual view showing a configuration of a final actor list for each video.

A conceptual view showing a configuration of a final actor list for each Korean movie among videos can be seen with reference to FIG. 4.

As with the description of FIG. 3, $M_i$ is a title of an $i^{th}$ video. For example, M may indicate a title of a video such as "The Age of Shadows," "The Map Against the World," or "The Face Reader."

$A_1, \ldots, A_k$ are listed in a final actor list of a corresponding video. For example, Song Kang-ho, Gong Yoo, Han Ji-min, and Eom Tae-goo may be included in a final actor list of the Korean movie "The Age of Shadows."

More than four actors actually appear in the Korean movie "The Age of Shadows," but as described with reference to FIG. 3, the final actor list is obtained by performing an update on the basis of appearance frequency. Accordingly, it can be seen that only four actors having a high appearance frequency are included in the final actor list of the Korean movie "The Age of Shadows."

The final actor list obtained by performing the update on the basis of the appearance frequency will be described again. Cha Seung-won, Yoo Jun-sang, Kim In-kwon, Nam Ji-hyun, Shin Dong-mi, Tae In-ho, and Kong Hyeong-jin may be included in the final actor list of the Korean movie "The Map Against the World." Also, Song Kang-ho, Lee Jung-jae, Baek Yun-shik, Jo Jung-suk, Lee Jong-suk, Kim Hye-soo, and Shin Gi-won may be included in the final actor list of the Korean movie "The Face Reader."

Referring to FIG. 1 again, the signature actor determination apparatus may acquire a signature actor for video identification by determining a signature actor of each of the plurality of videos. The determination of the signature actor may be performed as follows.

Figure 5:
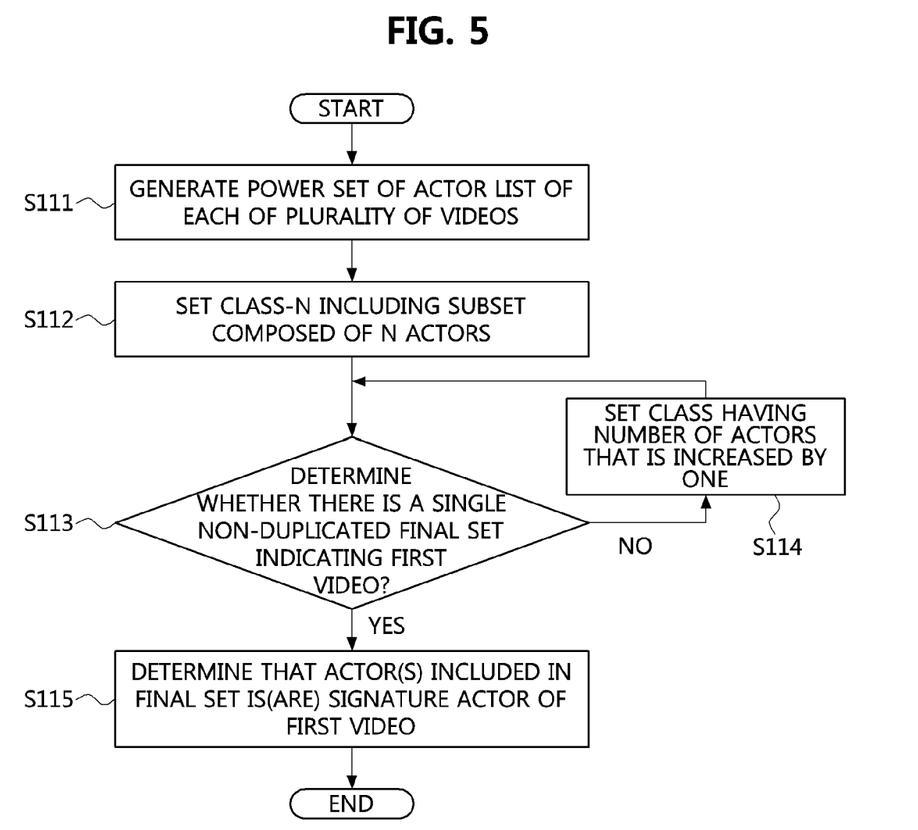
FIG. 5 is a flowchart showing a process of determining a signature actor.

FIG. 5 is a flowchart showing a process of determining a signature actor.

Referring to FIG. 5, the signature actor determination apparatus may generate a power set of a final actor list of each of a plurality of videos (S111). A power set of a reference set may refer to a set of all subsets of a reference set including an empty set. P(A) may refer to a power set of any set A.

When a final actor list for each video is assumed to be a reference set, a power set $P(M_i)$ of a video $M_i$ excluding an empty set, may be expressed as follows.

$$P(M_i) = \{\{A_1\}, \{A_2\}, \ldots, \{A_k\}, \{A_1, A_2\}, \\ \{A_1, A_3\}, \ldots, \{A_1, A_2, A_3\}, \ldots, \\ \{A_1, A_2, A_3, \ldots, A_k\}\} \quad \text{[Equation 2]}$$

The signature actor determination apparatus may generate power sets $P(M_i)$ of all videos $M_i$ excluding an empty set in a range of $1 \leq i \leq N$. Subsets of each of the power sets $P(M_i)$ may be expressed in the form of a Hasse diagram. A Hasse diagram of the power sets $P(M_i)$ may be expressed as follows.

Figure 6:
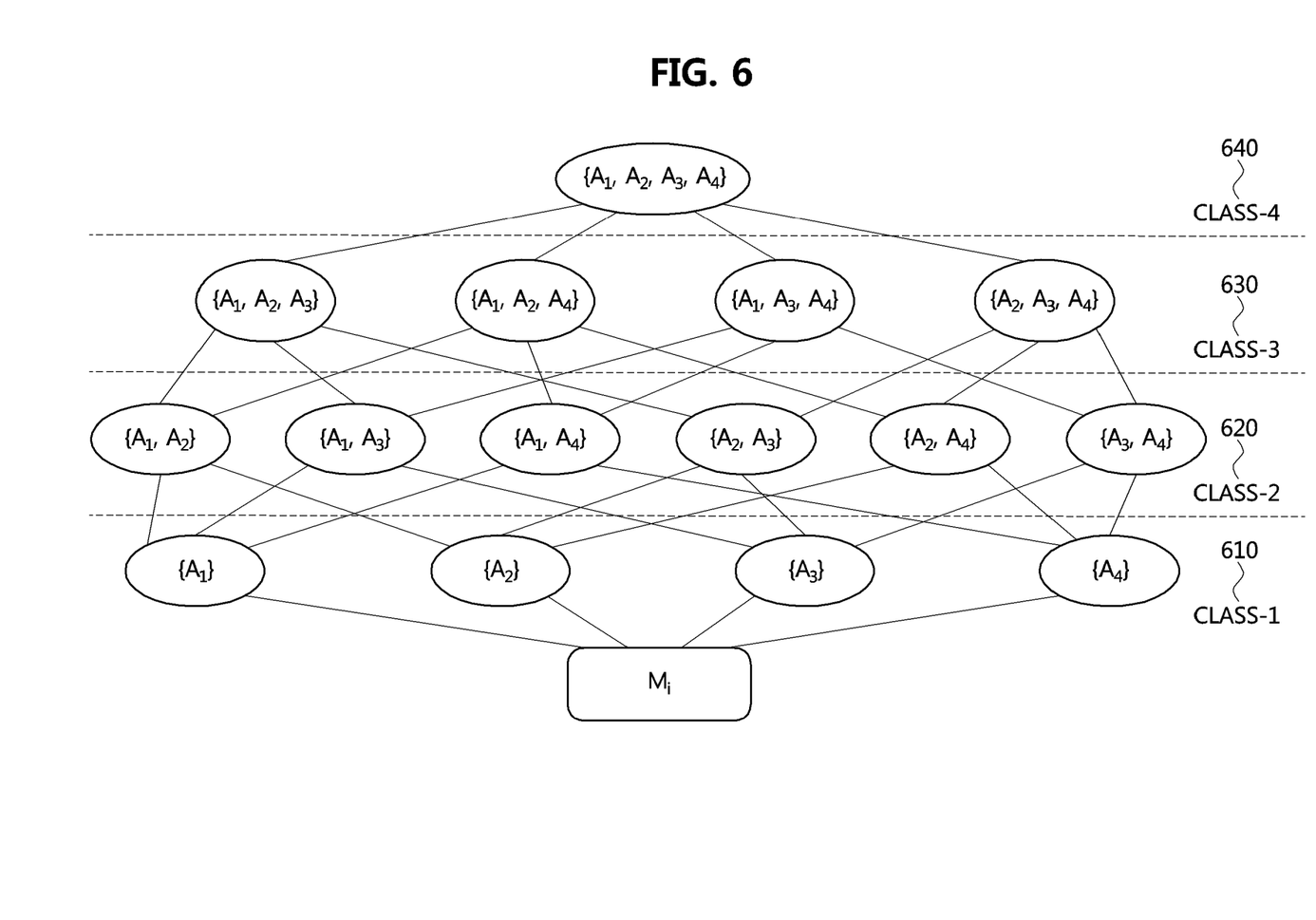
FIG. 6 is a conceptual view showing a Hasse diagram of subsets of actors of a video.

FIG. 6 is a conceptual view showing a Hasse diagram of subsets of actors of a video.

Referring to FIG. 6, it can be seen that the power set $P(M_i)$ is shown as a Hasse diagram when the number of actors included in a final actor list of the video $M_i$ is four.

The power set $P(M_i)$ indicates a case in which four actors are included in the final actor list, and thus the Hasse diagram may be classified into four classes.

Among all subsets of the power set $P(M_i)$, at least one subset composed of one actor may be expressed as class-1 610, and at least one subset composed of two actors may be expressed as class-2 620.

Among all of the subsets of the power set $P(M_i)$, at least one subset composed of three actors may be expressed as class-3 630, and at least one subset composed of four actors may be expressed as class-4 640.

In detail, the class-1 610 may include a total of four subsets $\{A_1\}$, $\{A_2\}$, $\{A_3\}$, and $\{A_4\}$. The class-2 620 may include a total of six subsets $\{A_1, A_2\}$, $\{A_1, A_3\}$, $\{A_1, A_4\}$, $\{A_2, A_3\}$, $\{A_2, A_4\}$, and $\{A_3, A_4\}$.

The class-3 630 may include a total of four subsets $\{A_1, A_2, A_3\}$, $\{A_1, A_2, A_4\}$, $\{A_1, A_3, A_4\}$, and $\{A_2, A_3, A_4\}$. The class-4 640 may include a total of one subset $\{A_1, A_2, A_3, A_4\}$.

Figure 7:
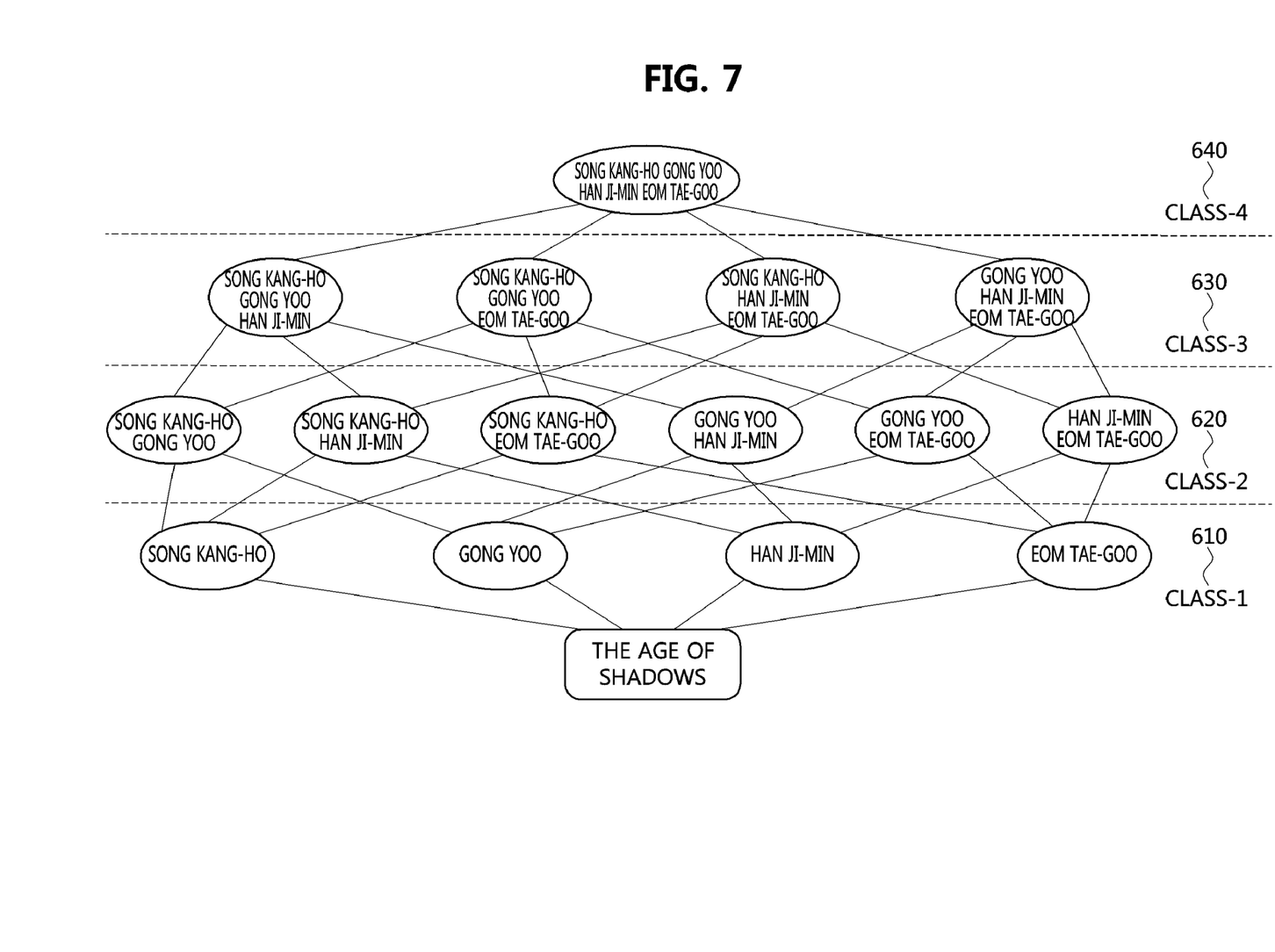
FIG. 7 is a conceptual view showing a Hasse diagram of subsets of actors of the Korean movie "The Age of Shadows"

A Hasse diagram written based on Korean movies may be as follows.

FIG. 7 is a conceptual view showing a Hasse diagram of subsets of actors of the Korean movie "The Age of Shadows."

Referring to FIG. 7, it can be seen that four actors (Song Kang-ho, Gong Yoo, Han Ji-min, and Eom Tae-goo) included in the final actor list of the Korean movie "The Age of Shadows" are expressed in the form of a Hasse diagram.

In detail, the class-1 610 may include a total of four subsets {Song Kang-ho}, {Gong Yoo}, {Han Ji-min}, and {Eom Tae-goo}. The class-2 620 may include a total of six subsets {Song Kang-ho, Gong Yoo}, {Song Kang-ho, Han Ji-min}, {Song Kang-ho, Eom Tae-goo}, {Gong Yoo, Han Ji-min}, {Gong Yoo, Eom Tae-goo}, and {Han Ji-min, Eom Tae-goo}.

The class-3 630 may include a total of four subsets {Song Kang-ho, Gong Yoo, Han Ji-min}, {Song Kang-ho, Gong Yoo, Eom Tae-goo}, {Song Kang-ho, Gong Yoo, Eom Tae-goo}, and {Gong Yoo, Han Ji-min, Eom Tae-goo}. The class-4 640 may include a total of one subset {Song Kang-ho, Gong Yoo, Han Ji-min, Eom Tae-goo}.

Referring to FIG. 5, the signature actor determination apparatus may set a class-n including at least one subset composed of n actors among subsets of the power sets $P(M_i)$ of all videos in the range of $1 \leq i \leq N$ written in the form of a Hasse diagram (S112).

When there is a single first subset indicating a first video in the class-n, the signature actor determination apparatus may set the first subset as a final set. Here, n may be an integer greater than or equal to 1.

When there is no single first subset indicating the first video in the class-n, the signature actor determination apparatus may set a class-(n+1) including n+1 actors from among the subsets (S114).

When there is a single second subset indicating the first video in the class-(n+1) (S113), the signature actor determination apparatus may determine the second subset as the final set. The signature actor determination apparatus may determine a single final set indicating the first video while increasing n by one.

In detail, the signature actor determination apparatus may set the class-1 in which the number of actors is one (S112). The signature actor determination apparatus may examine whether there is a duplicate between class-1s that are set.

For example, Song Kang-ho, Gong Yoo, Han Ji-min, and Eom Tae-goo may be included in the final actor list of the Korean movie "The Age of Shadows." Also, Song Kang-ho, Lee Jung-jae, Baek Yun-shik, Jo Jung-suk, Lee Jong-suk, Kim Hye-soo, and Shin Gi-won may be included in the final actor list of the Korean movie "The Face Reader."

In addition to the above-described two movies, actors may be included in final actor lists of multiple movies. In this case, the signature actor determination apparatus may generate a subset composed of one actor for each movie, and a result of the generation may be expressed as follows.

({Song Kang-ho}, {Gong Yoo}, {Han Ji-min}, {Eom Tae-goo}), ({Song Kang-ho}, {Lee Jung-jae}, {Baek Yun-shik}), ({ ... }, { ... }, ... ). When there is a single first subset that is not duplicated between the above-described class-1s (S113), the signature actor determination apparatus may determine the first subset as the final set.

For example, if there is a single movie that is specified only using {Song Kang-ho}, {Song Kang-ho} might be the first subset. However, since Song Kang-ho is an actor who appears in the Korean Movie "The Face Reader" as well as the Korean movie "The Age of Shadows," {Song Kang-ho} cannot be the first subset.

When there is no single first subset that is not duplicated between the set class-1s (S113), the signature actor determination apparatus may set the class-2 in which the number of actors is two. The signature actor determination apparatus may examine whether there is a duplicate between class-2s that are set.

For example, Song Kang-ho, Gong Yoo, Han Ji-min, and Eom Tae-goo may be included in the final actor list of the Korean movie "The Age of Shadows." Also, Song Kang-ho, Lee Jung-jae, and Baek Yun-shik may be included in the final actor list of the Korean movie "The Face Reader."

In addition to the above-described two movies, actors may be included in final actor lists of multiple movies. In this case, the signature actor determination apparatus may generate a subset composed of two actors for each movie, and a result of the generation may be expressed as follows:

({Song Kang-ho, Gong Yoo}, {Song Kang-ho, Han Ji-min}, {Song Kang-ho, Eom Tae-goo}, {Gong Yoo, Han Ji-min}, {Gong Yoo, Eom Tae-goo}, {Han Ji-min, Eom Tae-goo}), ({Song Kang-ho, Lee Jung-jae}, {Song Kang-ho, Baek Yun-shik}, {Lee Jung-jae, Baek Yun-shik}), ({ ... }, { ... }, ... ).

When there is a single second subset that is not duplicated between the above-described class-2s (S113), the signature actor determination apparatus may determine the second subset as the final set.

For example, if there is a single movie that is specified as only using {Song Kang-ho, Gong Yoo}, which is the Korean movie "The Age of Shadows," {Song Kang-ho, Gong Yoo}, which is the second subset of the Korean movie "The Age of Shadows," may be determined as the final set of the Korean movie "The Age of Shadows."

When there is no single second subset that is not duplicated between the set classes-2 (S113), the signature actor determination apparatus may set the class-3 in which the number of actors is three (S114).

The signature actor determination apparatus may examine whether there is a duplicate between class-3s that are set. When there is a single third subset that is not duplicated between class-3s that are set (S113), the signature actor determination apparatus may determine the third subset as the final set.

In this way, the signature actor determination apparatus may determine a single final set that does not include a duplicate while increasing the number of actors included in the class-n.

When the final set is determined, the signature actor determination apparatus may determine an actor(s) included in the final set as a signature actor of the first video (S115). The signature actor determination apparatus may use the signature actor to identify a specified video, that is, the first video, from any video (hereinafter referred to as a "second video").

Figure 8:
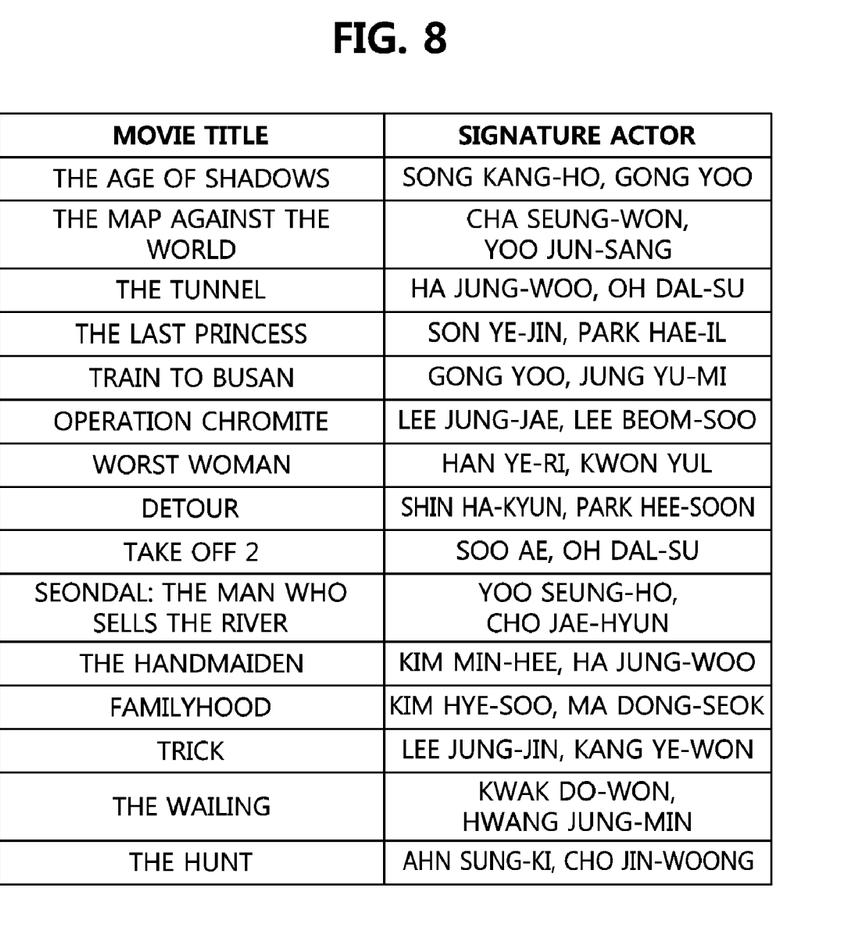
FIG. 8 is a table showing a part of a signature actor list for each video.

As an embodiment of the present invention, a result obtained by determining a signature actor on the basis of Korean movies may be expressed as follows.

FIG. 8 is a table showing some of a signature actor list for each video.

Referring to FIG. 8, a signature actor list for each video can be seen. Signature actors of the Korean movie "The Age of Shadows" are Song Kang-ho and Gong Yoo. Signature actors of the Korean movie "The Map Against the World" may be Cha Seung-won and Yoo Jun-sang. Signature actors of the Korean movie "The Tunnel" may be Ha Jung-woo and Oh Dal-su.

Signature actors of the Korean movie "The Last Princess" may be Son Ye-jin and Park Hae-il. Signature actors of the Korean movie "Train To Busan" may be Gong Yoo and Jung Yu-mi. Signature actors of the Korean movie "Operation Chromite" may be Lee Jung-jae and Lee Beom-soo. Signature actors of the Korean movie "The Worst Woman" may be Han Ye-ri and Kwon Yul.

Signature actors of the Korean movie "Detour" may be Shin Ha-kyun and Park Hee-soon. Signature actors of the Korean movie "Take Off 2" may be Soo Ae and Oh Dal-su. Signature actors of the Korean movie "Seondal: The Man Who Sells the River" may be Yoo Seung-ho and Cho Jae-hyun. Signature actors of the Korean movie "The Handmaiden" may be Kim Min-hee and Ha Jung-woo.

Signature actors of the Korean movie "Familyhood" may be Kim Hye-soo and Ma Dong-seok. Signature actors of the Korean movie "Trick" may be Lee Jung-jin and Kang Ye-won. Signature actors of the Korean movie "The Wailing" may be Kwak Do-won and Hwang Jung-min. Signature actors of the Korean movie "The Hunt" may be Ahn Sung-ki and Cho Jin-woong.

Referring to FIG. 1 again, the signature actor determination apparatus may analyze an actor appearing in a second video to be discovered (S120). The second video to be discovered may include a video that is used and distributed by unauthorized people who do not have permission from a right holder of the video.

The signature actor determination apparatus may determine whether the actor analyzed in the second video corresponds to a signature actor of the first video (S130). The signature actor determination apparatus may perform facial recognition on an actor to determine whether the actor appears in the second video.

The signature actor determination apparatus may determine that the second video is the first video when the actor analyzed in the second video corresponds to the signature actor of the first video (S140). The signature actor determination apparatus may end video analysis when the second video is determined as the first video.

In detail, a recognition result of a facial recognition system based on machine learning such as deep learning may be output as a probability for each face. Assuming that a recognition result log having the following form is obtained from the facial recognition system, a process of analyzing the log and identifying a video may be as follows. The video may be expressed as a combination of the following numbers.

['frameNo', 'diff', 'p1', 'p2', 'p3', 'top1', 'top2', 'top3']

frameNo may be a current frame number in the video. diff may be a difference between p1 and p2. p1 may be a probability that a facial recognition result indicates an actor top1. top1 may be a name of an actor estimated through the facial recognition result. p3 and p3 may be probabilities that the facial recognition result indicates an actor top2 and an actor top3, and p1, p2, and p3 may have a relationship of p1>p2>p3.

As an example for facilitating understanding of this, the facial recognition result log may be assumed to be recognized as follows.

[3076, 8.08, 21.98, 13.90, 11.35, SongKangho, KimYoonseak, KoChangseok]

[3551, 3.47, 14.39, 10.92, 10.42, ChoiMinsik, AhnSungki, KoChangseok]

[6476, 8.39, 18.60, 10.21, 10.18, SongKangho, ChoiMinsik KoChangseok]

[12351, 6.76, 18.83, 12.07, 10.89; KongYu, JangHyuk, ParkSungwon]

[13026, 5.26, 19.75, 14.49, 13.11, KongYu, ParkHaeil, RyuSeungbum]

A face detected from a 3076th frame has a 21.98% probability of being Song Kang-ho's face, a 13.90% probability of being Kim Yoon-seok's face, and a 11.35% probability of being Ko Chang-seok® s face. In this case, the probability difference diff between Song Kang-ho, who is the actor top1, and Kim Yoon-seok, who is the actor top2, may be 8.08.

A step of identifying a copyrighted product using a facial recognition log file will be described in detail as follows. In order to enhance recognition reliability of an actor estimated from a face detected from a corresponding frame, only a result greater than or equal to a certain value is used for analysis by utilizing the difference diff between p1 and p2. Thus, it is possible to increase accuracy of a final copyrighted product identification result.

The signature actor determination apparatus may calculate an appearance probability for each actor in a case in which diff>N in a recognition result log. In this case, accuracy of an identification result may be changed by changing N. In an embodiment of the present invention, N is set as 5.0, and only an actor recognition result having diff of 5.0 or more is used for analysis. A facial recognition result excluding a part in which diff is less than or equal to 5.0 may be as follows.

[3076, 8.08, 21.98, 13.90, 0.11.35, SongKangho, KimYoonseok, KoChangseok]

:ignore because diff≤5.0

[6476, 8.39, 18.60, 10.21, 10.18, SongKangho, ChoiMinsik, KoChangseok]

[12351, 6.76, 18.83, 12.07, 10.89, KongYu, JangHyuk, ParkSungwon]

[13025, 5.26, 19.75, 14.49, 13.11, KongYu, ParkHaeil, RyuSeungbum]

From the above information, the appearance probability for each actor may be calculated in the following method.

$$1-\{(1-\alpha_1)(1-\alpha_2)(1-\alpha_3)\ldots(1-\alpha_n)\} \quad \text{[Equation 3]}$$

where $\alpha_i$ may be a probability that an actor A "top1" appears in a corresponding video.

When only an actor recognition result log is used, a probability that the actor Song Kang-ho will appear in may be calculated as $1-\{(1-02198)(1-0.1860)\}=0.3649$ and a probability that the actor Gong Yoo will appear may be calculated as $1-\{(1-0.1883)(1-01975)\}=0.3486$.

When a final or any appearance probability for each actor is calculated as shown in Table 1 by accumulating the above recognition result log, the signature actor determination apparatus may obtain any copyright identification result based on the probability.

Figure 9:
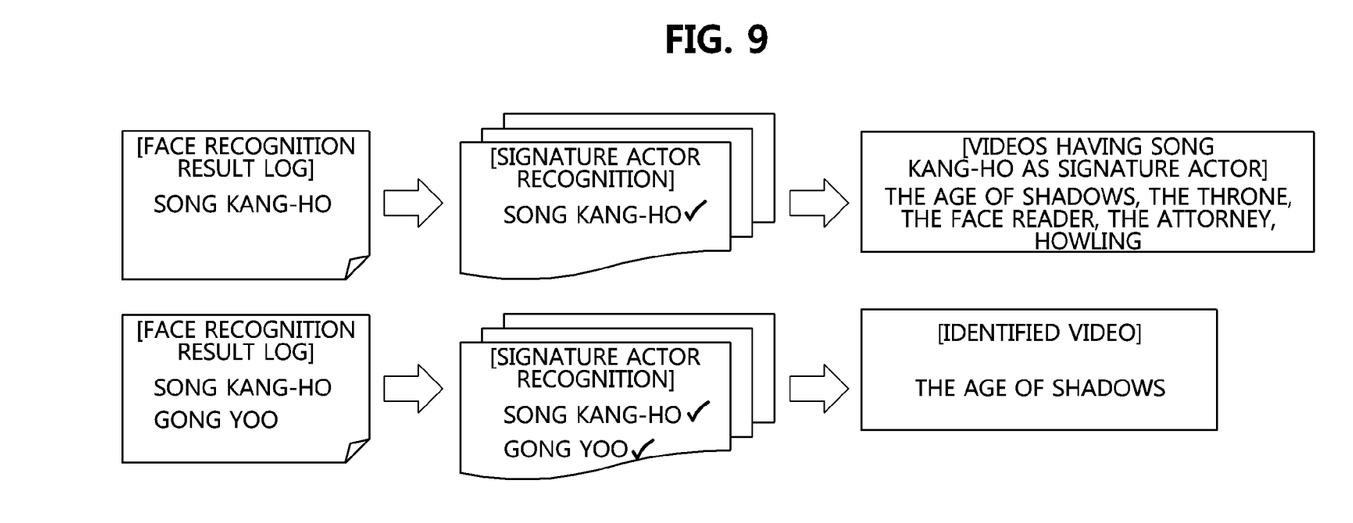
FIG. 9 is a conceptual view showing an example of video identification obtained by searching for a signature actor.

A process in which a video is identified based on a signature actor may be as follows.

FIG. 9 is a conceptual view showing an example of video identification obtained by searching for a signature actor.

Referring to FIG. 9, a first video may be identified when all signature actors of the first video intended to be searched for in the second video are confirmed.

When the actor "Song Kang-ho" is primarily recognized in the second video, the signature actor determination apparatus cannot yet specify the second video because videos having "Song Kang-ho" as a signature actor are the Korean movies "The Age of Shadows," "The Throne," "The Face Reader," "The Attorney," etc.

However, when the signature actor determination apparatus additionally recognizes the actor "Gong Yoo" in the second video, the signature actor determination apparatus may specify the second video as the Korean movie "The Age of Shadows" because the Korean movie "The Age of Shadows" is one video having "Song Kang-ho" and "Gong Yoo" as signature actors. A process in which a video is identified based on a signature actor may be described in detail as follows.

TABLE 1

| Actor Name | Appearance Probability |
| --- | --- |
| Song Kang-ho | 0.7194 |
| Gong Yoo | 0.7544 |
| Park Hae-il | 0.4295 |
| Jang Hyuk | 0.3742 |

A final or any appearance probability for each actor may be calculated as shown in Table 1 by accumulating continuous recognition results. In this case, it is possible to determine a movie having the highest probability as an identification result of any copyrighted product by listing all movies including actors (Song Kang-ho, Gong Yoo, Park Hae-il, and Jang Hyuk) estimated as "top1" as signature actors and calculating an appearance probability of each of the movies.

TABLE 2

| Movie Title | Number of Actors/ Number of Signature Actors | Set of Signature Actors | Identification Probability |
| --- | --- | --- | --- |
| The Age of Shadows | 2/2 | Song Kang-ho, Gong Yoo | 73.69% |
| Train To Busan | 1/2 | Gong Yoo, Ma Dong-seok | 37.72% |
| The face reader | 1/2 | Song Kang-ho, Lee Jung-jae | 35.97% |
| The Throne | 1/2 | Song Kang-ho, Yoo Ah-in | 35.97% |
| A Muse | 1/2 | Park Hae-il, Kim Go-eun | 21.475% |
| Flu | 1/2 | Jang Hyuk, Soo Ae | 18.71% |

Referring to Table 2, a set of signature actors of the Korean movie "The Age of Shadows" is {Song Kang-ho, Gong Yoo}. A final identification probability may be calculated as an average of appearance probabilities of the two actors because both Song Kang-ho and Gong Yoo appear in a recognition result log thereof.

In the case of "Train To Busan," "The Face Reader," and "The Throne," only one actor in signature actor sets thereof appears in recognition results thereof, and thus a value obtained by dividing an appearance probability of a corresponding actor by 2, which is the number of signature actors, may be the final identification probability.

Accordingly, since a result obtained by analyzing the log based on probability is that the Korean movie "The Age of Shadows" has the highest probability, the obtained result may be a final identification result of any copyrighted product.

Figure 10:
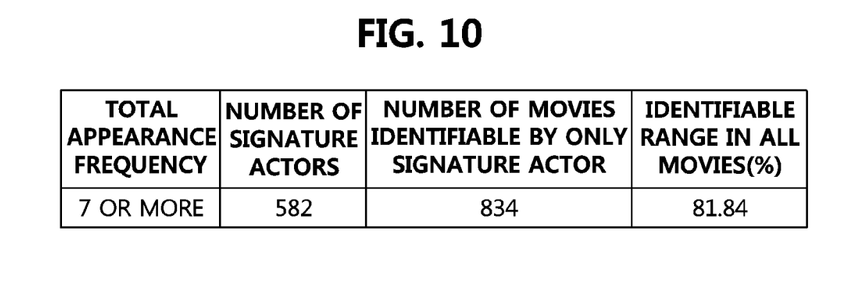
FIG. 10 is a table showing the number of signature actors and the number of identifiable movies.

FIG. 10 is a table showing the number of signature actors and the number of identifiable movies.

Referring to FIG. 10, a detailed embodiment of the present invention can be seen. The total number of signature actors was determined as 582 by determining signature actors from a final actor list in which actors have a total appearance frequency of 7 or more times in 1019 Korean movies according to the method of the present invention.

By searching through a plurality of videos based on a signature actor, it was confirmed that the number of movies that may be identified from the 1019 Korean movies only by the signature actor is 834. As confirmed above, 81.84% of all the movies may be identified using only the signature actor.

According to embodiments of the present invention, it is possible to predetermine a minimum number of actors needed for machine learning through the signature actor determination method and thus also predict an identifiable range.

It is also possible to check for an initial illegal leak of a new video because there is no need to secure a fingerprint extracted from original data and signals needed for conventional fingerprint-based video identification.

It is also possible to accurately identify a corresponding video on the basis of probability by using actors having a probability greater than or equal to a predetermined value of a facial recognition result without needing to search through all sections of a video in order to accurately identify the video.

The methods according to embodiments of the present invention may be implemented as program instructions executable by a variety of computers and recorded on a computer readable medium. The computer readable recording medium may include a program instruction, a data file, a data structure, or a combination thereof. The program instruction recorded on the computer readable medium may be designed and configured specifically for the present invention, or may be publicly known and available to those skilled in the field of computer software.

Examples of the computer readable medium may include a hardware device such as a ROM, a RAM, and a flash memory, which are specifically configured to store and execute the program instruction. Examples of the program instruction include machine codes made by, for example, a compiler, as well as high-level language codes executable by a computer, using an interpreter. The above hardware device can be configured to operate as at least one software module in order to perform the operation of the present invention, and vice versa.

While the example embodiments of the present invention and their advantages have been described in detail, it should be understood that various changes, substitutions and alterations may be made herein without departing from the scope of the invention.

What is claimed is:

1. A signature actor determination method of a signature actor determination apparatus including a processor, the signature actor determination method comprising:
    setting, by the processor, an actor list including an actor appearing in each of a plurality of videos;
    generating, by the processor, a plurality of subsets including at least one actor in the actor list;
    determining, by the processor, a single final set of a first video from among the plurality of subsets;
    determining, by the processor, that an actor included in the final set is a signature actor of the first video;
    analyzing an actor appearing in a second video to be discovered, including using facial recognition to calculate a probability of the actor's appearance in the second video; and
    determining that the second video is the first video when the actor analyzed in the second video corresponds to the signature actor of the first video.

2. The signature actor determination method of claim 1, wherein the actor list includes a leading actor and a supporting actor who appear in each of the plurality of videos.

3. The signature actor determination method of claim 1, wherein the actor list includes at least one actor having an appearance frequency greater than or equal to a predetermined reference.

4. The signature actor determination method of claim 3, wherein the appearance frequency is determined based on at least one of a total number of appearances and an appearance time of each of the actors in the plurality of videos.

5. The signature actor determination method of claim 1, wherein the determining of a single final set comprises:
    setting a class-n including at least one subset composed of n actors among the plurality of subsets; and
    determining that a single first subset indicating the first video is the final set when the first subset is present in the class-n, where n is an integer greater than or equal to 1.

6. The signature actor determination method of claim 5, wherein the determining of a single final set further comprises:
    setting a class-(n+1) including at least one subset composed of n+1 actors among the plurality of subsets when there is no single first subset indicating the first video in the class-n; and
    determining that a single second subset indicating the first video is the final set when the second subset is present in the class-(n+1).

7. The signature actor determination method of claim 1, wherein the determining of the second video as the first video is performed based on information obtained through an appearance probability for each actor.

8. The signature actor determination method of claim 7, wherein the determining of the second video as the first video is performed using only information indicating a difference of appearance probabilities between two actors having the highest and second highest appearance probabilities greater than or equal to a predetermined value among the information obtained through the appearance probability for each of the actors.

9. A signature actor determination apparatus comprising:
    a processor; and
    a memory configured to store at least one instruction executable by the processor,
    wherein the at least one instruction is configured to:
    set an actor list including an actor appearing in each of a plurality of videos,
    generate a plurality of subsets including at least one actor in the actor list,
    determine a single final set of a first video from among the plurality of subsets,
    determine that an actor included in the final set is a signature actor of the first video,
    analyze an actor appearing in a second video to be discovered, including using facial recognition to calculate a probability of the actor's appearance in the second video, and
    determine that the second video is the first video when the actor analyzed in the second video corresponds to the signature actor of the first video.

10. The signature actor determination apparatus of claim 9, wherein the actor list includes a leading actor and a supporting actor who appear in each of the plurality of videos.

11. The signature actor determination apparatus of claim 9, wherein the actor list includes at least one actor having an appearance frequency greater than or equal to a predetermined reference.

12. The signature actor determination apparatus of claim 11, wherein the appearance frequency is determined based on at least one of a total number of appearances and an appearance time of each of the actors in the plurality of videos.

13. The signature actor determination apparatus of claim 9, wherein when the final set is determined, the at least one instruction is executed to set a class-n including at least one subset composed of n actors among the plurality of subsets and determine that a single first subset indicating the first video is the final set when the first subset is present in the class-n, where n is an integer greater than or equal to 1.

14. The signature actor determination apparatus of claim 13, wherein when the final set is determined, the at least one instruction is executed to set a class-(n+1) including at least one subset composed of n+1 actors among the plurality of subsets when there is no single first subset indicating the first image in the class-n and determine that a single second subset indicating the first video is the final set when the second subset is present in the class-(n+1).

15. The signature actor determination apparatus of claim 9, wherein the determining of the second video as the first video is performed based on information obtained through an appearance probability for each actor.

16. The signature actor determination apparatus of claim 15, wherein the determining of the second video as the first video is performed using only information indicating a difference of appearance probabilities between two actors having the highest and second highest appearance probabilities greater than or equal to a predetermined value among the information obtained through the appearance probability for each of the actors.

\* \* \* \* \*